United States Patent
Bailey et al.

(10) Patent No.: US 10,547,470 B2
(45) Date of Patent: Jan. 28, 2020

(54) SELF-LOCKING A NETWORK COMMUNICATIONS COMPONENT TRANSMISSION RATE

(71) Applicant: LENOVO ENTERPRISE SOLUTIONS (SINGAPORE) PTE. LTD., Singapore (SG)

(72) Inventors: Warren D. Bailey, Pittsboro, NC (US); Patrick L. Caporale, Cary, NC (US)

(73) Assignee: Lenovo Enterprise Solutions (Singapore) Pte. Ltd., Singapore (SG)

(*) Notice: Subject to any disclaimer, the term of this patent is extended or adjusted under 35 U.S.C. 154(b) by 149 days.

(21) Appl. No.: 15/257,119

(22) Filed: Sep. 6, 2016

(65) Prior Publication Data
US 2018/0069759 A1    Mar. 8, 2018

(51) Int. Cl.
*H04L 29/08*    (2006.01)
*H04L 12/40*    (2006.01)

(52) U.S. Cl.
CPC .................................. *H04L 12/40* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,497,656 B1* | 12/2002 | Evans | ................. | H04B 1/7163 128/903 |
| 6,567,420 B1* | 5/2003 | Tiedemann, Jr. | ..... | H04W 28/02 370/230 |
| 7,437,079 B1* | 10/2008 | Hofmeister | ............ | H04B 10/40 375/219 |
| 9,473,973 B1* | 10/2016 | Oroskar | ............ | H04W 28/0236 |
| 2005/0125713 A1* | 6/2005 | Roh | ........ | H04L 1/0002 714/748 |
| 2006/0104242 A1* | 5/2006 | Kim | ...................... | H04L 1/1812 370/329 |
| 2010/0205365 A1* | 8/2010 | Huang | ................. | G06F 13/385 711/111 |
| 2013/0322255 A1* | 12/2013 | Dillon | ..................... | H04L 47/22 370/236 |
| 2017/0093699 A1* | 3/2017 | Crupnicoff | .............. | H04L 69/16 |

* cited by examiner

*Primary Examiner* — Chris Parry
*Assistant Examiner* — Stephen J Houlihan

(57) ABSTRACT

A network communications component may be configured to self-lock at a signaled transmission rate. The network communications component may receive a first transmission rate signal indicating a first transmission rate. It may be determined that a transmission rate for the network communications component is unset on the network communications component. Determining that the transmission rate for the network communications component is unset may include accessing an entry for the transmission rate in a vital product data stored on the network communications component. The transmission rate for the network communications component may be set by storing an indication of the received first transmission rate in a memory location on the network communications component. Data transmission by the network communications component may be limited, in accordance with the stored indication of the first transmission rate, to not exceed the set transmission rate.

20 Claims, 6 Drawing Sheets

SELF-LOCKING A NETWORK COMMUNICATIONS COMPONENT TRANSMISSION RATE

BACKGROUND

Field of the Invention

The field of the invention is data processing, or, more specifically, methods, apparatus, and products for self-locking a network communications component transmission rate.

Description of Related Art

Local area networks and wide area networks use multiple transmission rates across different transmission media. The transmission rates used across any given transmission media is a product of the technological limitations of the devices and communications media transmitting the data across each segment of the communications network. Much of the value of the devices that facilitate data transmission across network segments is derived from the transmission rate capabilities of the device. For example, devices capable of higher transmission rates often command a higher price than devices that are limited to lower transmission rates.

SUMMARY

Methods, systems, and apparatus for self-locking a network communications component transmission rate are disclosed in this specification. Self-locking a network communications component transmission rate includes receiving, by the network communications component, a first transmission rate signal indicating a first transmission rate; determining that a transmission rate for the network communications component is unset; setting the transmission rate for the network communications component by storing an indication of the first transmission rate in a memory location on the network communications component; and limiting, based on the stored indication of the first transmission rate, data transmission on the network communications component to the first transmission rate.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
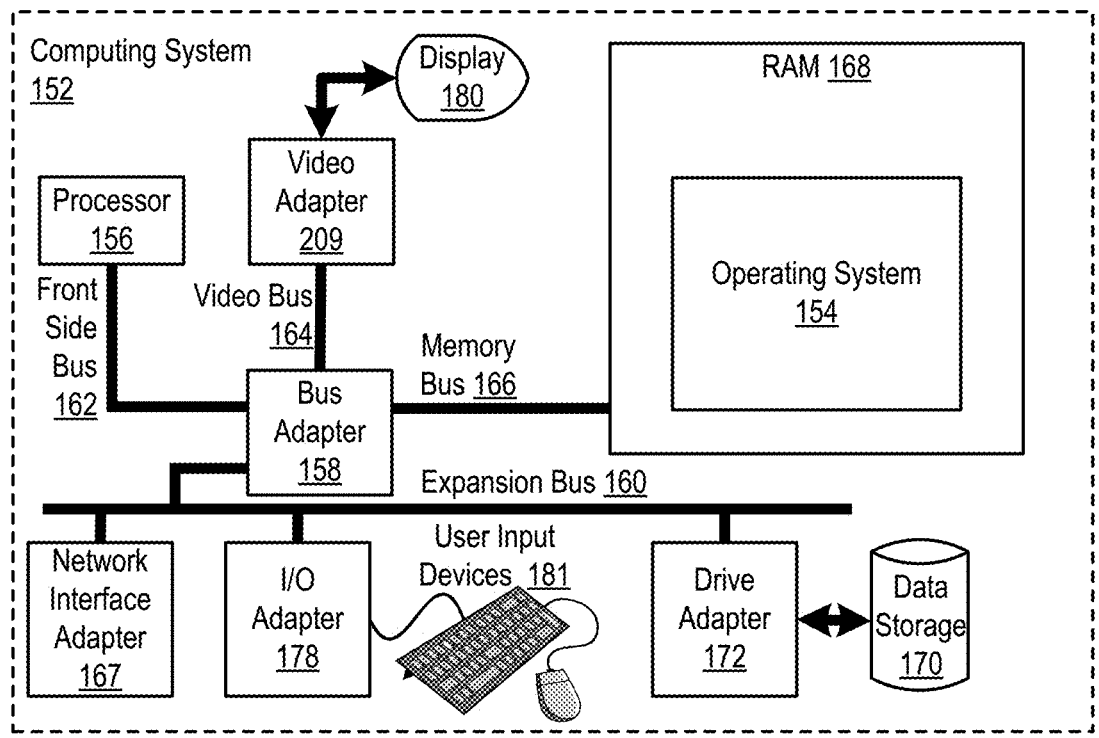
FIG. 1 sets forth a block diagram of an example system configured for self-locking a network communications component transmission rate according to embodiments of the present invention.

Exemplary methods, apparatus, and products for self-locking a network communications component transmission rate in accordance with the present invention are described with reference to the accompanying drawings, beginning with FIG. 1. FIG. 1 sets forth a block diagram of automated computing machinery comprising an exemplary computing system (152) configured for self-locking a network communications component transmission rate according to embodiments of the present invention. The computing system (152) of FIG. 1 includes at least one computer processor (156) or 'CPU' as well as random access memory (168) ('RAM') which is connected through a high speed memory bus (166) and bus adapter (158) to processor (156) and to other components of the computing system (152).

Stored in RAM (168) is an operating system (154). Operating systems useful in computers configured for self-locking a network communications component transmission rate according to embodiments of the present invention include UNIX™, Linux™, Microsoft XP™, AIX™, IBM's i5/OS™, and others as will occur to those of skill in the art. The operating system (154) in the example of FIG. 1 is shown in RAM (168), but many components of such software typically are stored in non-volatile memory also, such as, for example, on a disk drive (170).

The computing system (152) of FIG. 1 includes disk drive adapter (172) coupled through expansion bus (160) and bus adapter (158) to processor (156) and other components of the computing system (152). Disk drive adapter (172) connects non-volatile data storage to the computing system (152) in the form of disk drive (170). Disk drive adapters useful in computers configured for self-locking a network communications component transmission rate according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computing system (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computing system (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computing system (152) of FIG. 1 includes a network interface adapter (167) for data communications with other computers (182) and for data communications with a data communications network. Such data communications may be carried out serially through RS-232 connections, through external buses such as a Universal Serial Bus ('USB'), through data communications networks such as IP data communications networks, and in other ways as will occur to those of skill in the art. Network interface adapters implement the hardware level of data communications through which one computer sends data communications to another computer, directly or through a data communications network. Examples of network interface adapters useful in computers configured for self-locking a network communications component transmission rate according to embodiments of the present invention include modems for wired dial-up communications, Ethernet (IEEE 802.3) adapters for wired data communications, and 802.11 adapters for wireless data communications.

Figure 2:
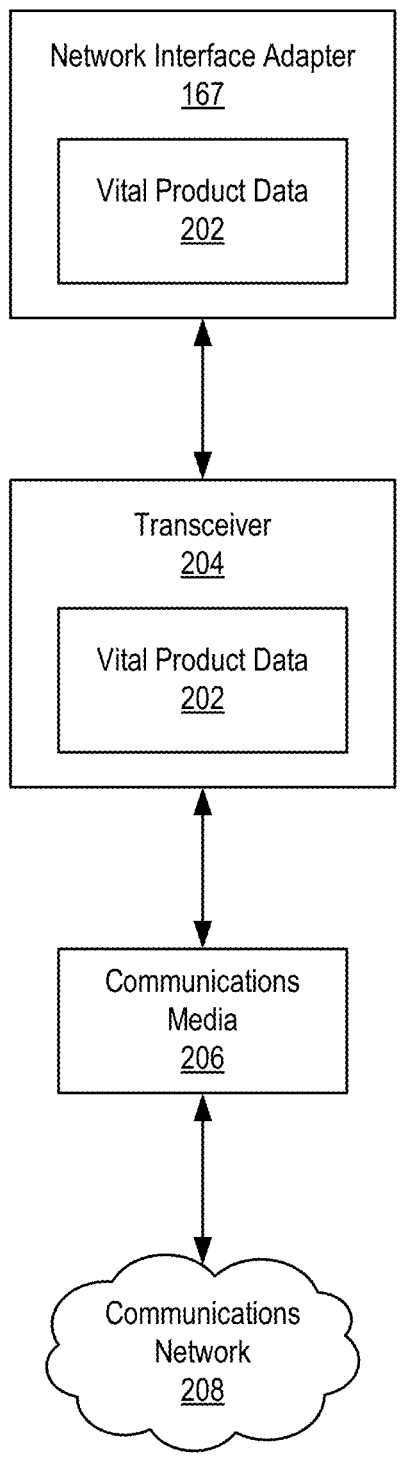
FIG. 2 sets forth a block diagram for self-locking a network communications component transmission rate according to embodiments of the present invention.

FIG. 2 is an example block diagram of a system configured for self-locking a network communications component transmission rate. FIG. 2 includes a network interface adapter (167), a transceiver (204), a communications media (206), and a communications network (208). The network interface adapter (167) and the transceiver (204) may each include a vital product data (202).

The network interface adapter (167) and transceiver (204) are network communications components. A network communications component is a component of a network communications device or adapter that facilitates the transmission and reception of data communications. Each network communications component may also control the transmission rate of data through the device or adapter. Each network communications component includes logic that determines the maximum transmission rate for the network communications component.

The vital product data (202) is a set of data describing the network communications component. The vital product data (202) includes an indication of whether the transmission rate for the network communications component is set or unset. If set, the vital product data (202) also includes an indication of the set transmission rate. The vital product data (202) may also include other information about the network communications component, such as a hardware revision identifier, a model identifier, a maximum transmission rate, and unique identifier.

The transceiver (204) adapts the network interface adapter (167) to the physical communications media (206). The transceiver (204) may, for example, adapt optical communications media (i.e., optical cables) to an electrical interface on the network interface adapter (167). The transceiver (204) may attach to the network interface adapter (167) via a standardized cage (e.g., Small Form-factor Pluggable (SFP), Quad Small Form-factor Pluggable (QSFP), etc.).

The communications media (206) is the physical conduit used to transmit data to other computing systems on the communications network (208). Examples of communications media (206) include unshielded twisted pair (UTP) media with RJ45 connectors and direct attach copper cables.

The communications network (208) includes at least one computing system operatively connected to a network communications component via the communications media (206). The communications network (208) may include a group of interconnected computing systems and network devices connected by communications media which allows data to be transmitted among and between the connected computing systems. Examples of communications networks (208) include local area networks and wide area networks, such as the Internet.

Figure 3:
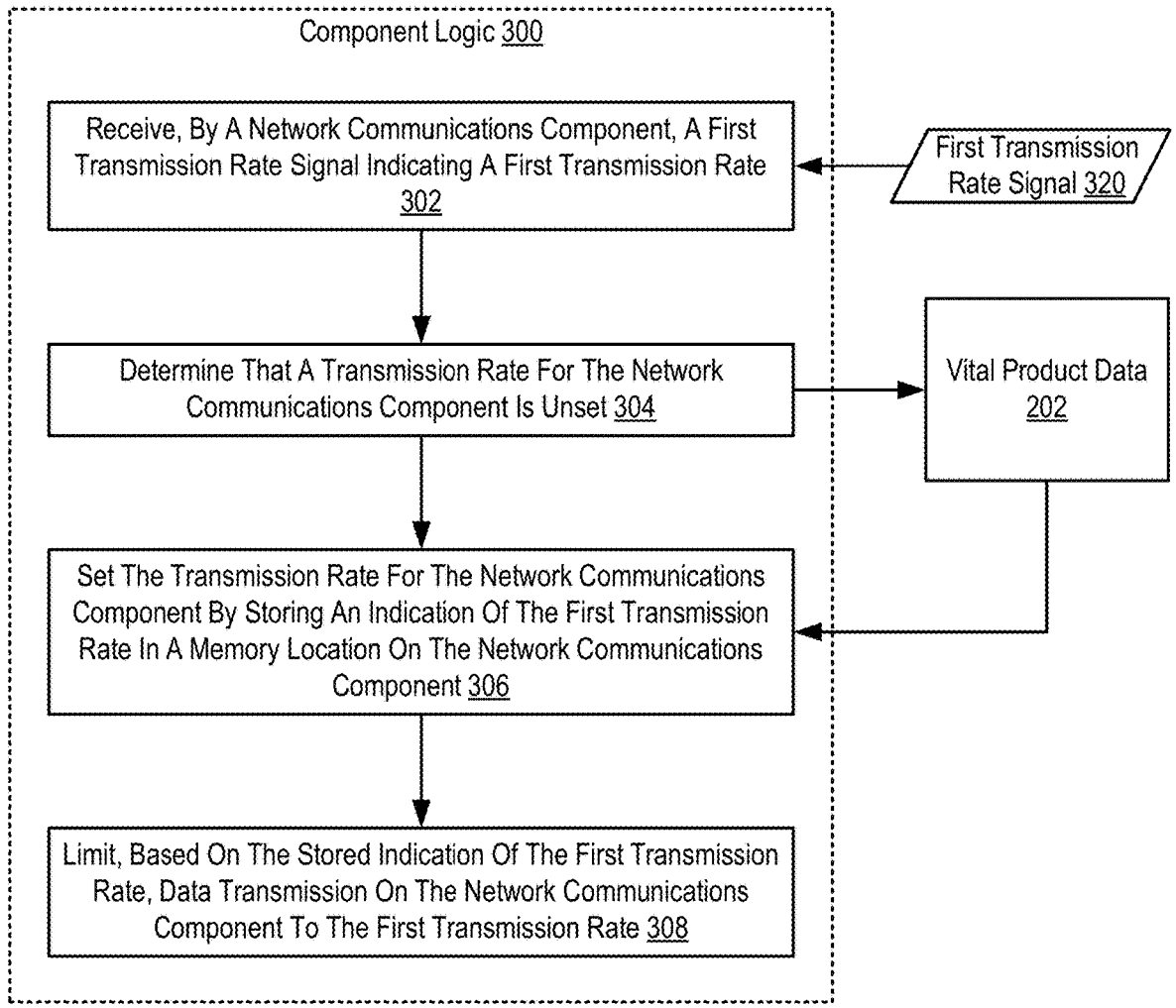
FIG. 3 sets forth a flow chart illustrating an exemplary method for self-locking a network communications component transmission rate according to embodiments of the present invention.

For further explanation, FIG. 3 sets forth a flow chart illustrating an exemplary method for self-locking a network communications component transmission rate according to embodiments of the present invention. The method of FIG. 3 includes receiving (302), by a network communications component, a first transmission rate signal (320) indicating a first transmission rate. Receiving (302), by a network communications component, a first transmission rate signal (320) indicating a first transmission rate may be carried out by operatively coupling the network communications component to a communications network (e.g., a single computing system, a local area network, etc.) and transmitting an auto-detect or auto-negotiate message on the communications network.

Receiving (302), by a network communications component, a first transmission rate signal (320) indicating a first transmission rate may be carried out in response to operatively coupling the network communications component to the communications network. Upon operatively coupling the network communications component to another computing device or network device, the network communications component may auto-detect or auto-negotiate with one or more other computing devices or network devices on the communications network to receive the transmission rate signal. The transmission rate signal may be sent to the network communications component in response to an auto-detect or auto-negotiate signal sent from the network communications component. The transmission rate signal (320) may also be received via another network communications component. For example, the transceiver may receive the transmission rate signal via a network interface adapter.

Receiving (302), by a network communications component, a first transmission rate signal (320) indicating a first transmission rate may also be carried out by reading the vital product data of the computing device or network device coupled to the network communications component. The component logic (300) may send a request for the vital product data via the communications network (208) once a connection has been detected.

The first transmission rate signal (320) is a signal received by the network communications component (e.g., network interface adapter or transceiver) that includes an indication of a transmission rate. The indication of the transmission rate may be a maximum available transmission rate across that segment of the communications network. The indication of the transmission rate may be presented in terms of the number of bits per second supported by the segment, network, or connected network devices.

The method of FIG. 3 also includes determining (304) that a transmission rate for the network communications component is unset. Determining (304) that a transmission rate for the network communications component is unset may be carried out by accessing an entry for the transmission rate in a vital product data (202) stored on the network communications component; and determining that the entry for the transmission rate indicates that no transmission rate has been set for the network communications component.

The method of FIG. 3 also includes setting (306) the transmission rate for the network communications component by storing an indication of the first transmission rate in a memory location on the network communications component. Setting (306) the transmission rate for the network communications component by storing an indication of the first transmission rate in a memory location on the network communications component may be carried out by storing (402) the indication of the transmission rate in a vital product data (202) in non-volatile memory on the network communications component.

For example, a manufacturer may want to sell 16 Gb/s network interface adapters at one price and 8 Gb/s at a lower price, but produce and maintain an inventory of only 16 Gb/s network interface adapters. This may occur if the cost per device for manufacturing only 16 Gb/s network interface adapters is less than the cost per device for manufacturing two different types of network interface adapters. Each 16 Gb/s network interface adapters may be manufactured with a vital product data that includes an unset transmission rate. Upon receiving an order for an 8 Gb/s network interface adapter, the manufacture connects a 16 Gb/s network interface adapter to a test network that advertises (i.e., sends out a transmission rate signal) a transmission rate of 8 Gb/s. The 16 Gb/s network interface adapter receives the transmission rate signal that indicates a transmission rate of 8 Gb/s. The component logic within the 16 Gb/s network interface adapter determines that the transmission rate in the vital product data is unset. The component logic within the 16 Gb/s network interface adapter then sets the maximum transmission rate within the vital product data to 8 Gb/s.

The method of FIG. 3 also includes limiting (308), based on the stored indication of the first transmission rate, data transmission on the network communications component to the first transmission rate. Limiting (308), based on the stored indication of the first transmission rate, data transmission on the network communications component to the first transmission rate may be carried out by transmitting data at a maximum transmission rate of the stored indication of the first transmission rate. Continuing with the example above, once the purchaser receives the network interface adapter, the purchaser may couple the adapter to a communications network that advertises 16 Gb/s. However, the network interface adapter will only transmit data at a maximum speed of 8 Gb/s, the transmission rate set in the vital product data on the network interface adapter.

Figure 4:
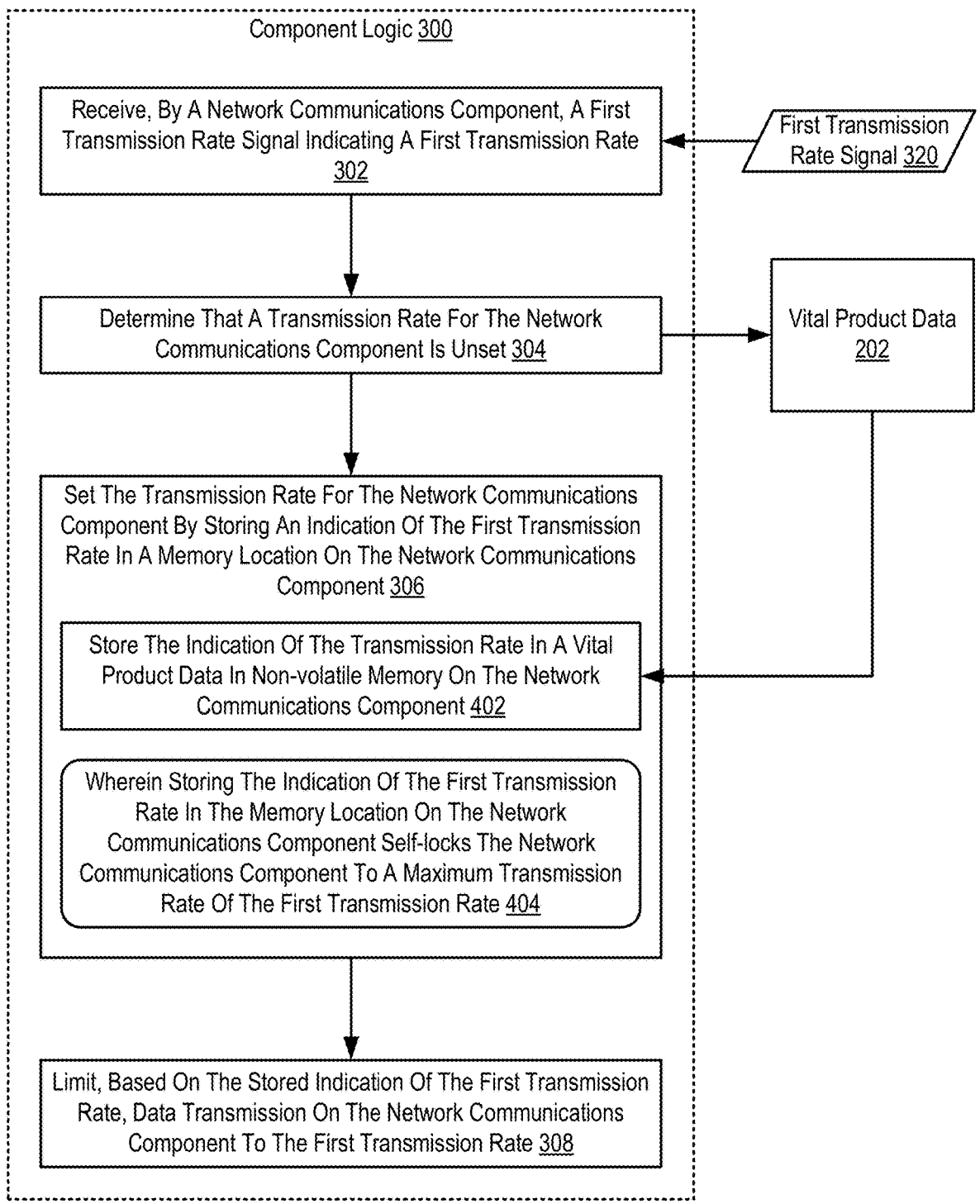
FIG. 4 sets forth a flow chart illustrating an exemplary method for self-locking a network communications component transmission rate according to embodiments of the present invention.

For further explanation, FIG. 4 sets forth a flow chart illustrating an exemplary method for self-locking a network communications component transmission rate according to embodiments of the present invention that includes receiving (302), by a network communications component, a first transmission rate signal (320) indicating a first transmission rate; determining (304) that a transmission rate for the network communications component is unset; setting (306) the transmission rate for the network communications component by storing an indication of the first transmission rate in a memory location on the network communications component; and limiting (308), based on the stored indication of the first transmission rate, data transmission on the network communications component to the first transmission rate.

The method of FIG. 4 differs from the method of FIG. 3, however, in that setting (306) the transmission rate for the network communications component by storing an indication of the first transmission rate in a memory location on the network communications component includes storing (402) the indication of the transmission rate in a vital product data (202) in non-volatile memory on the network communications component. Storing (402) the indication of the transmission rate in a vital product data (202) in non-volatile memory on the network communications component may be carried out by altering an entry in the vital product data that indicates that the transmission rate is unset to indicate that the transmission rate is set. For example, an element, such as a bit, in the vital product data may indicate whether the transmission rate is set. A down bit may indicate that the transmission rate is unset, and an up bit may indicate that the transmission rate is set.

Storing (402) the indication of the transmission rate in a vital product data (202) in non-volatile memory on the network communications component may also be carried out by altering an entry in the vital product data to indicate a maximum transmission rate. For example, the vital product data (202) may include an entry that indicates the maximum transmission rate for the network communications component. If the transmission rate is unset, then the entry that indicates the maximum transmission rate may be null or may indicate the maximum transmission rate of the hardware present on the network communications component. Once the transmission rate is set, the maximum transmission rate (e.g., 8 Gb/s) may be stored in the maximum transmission rate entry.

The method of FIG. 4 also differs from the method of FIG. 3 in that setting (306) the transmission rate for the network communications component by storing an indication of the first transmission rate in a memory location on the network communications component includes wherein storing the indication of the first transmission rate in the memory location on the network communications component self-locks (404) the network communications component to a maximum transmission rate of the first transmission rate. The maximum transmission rate may be self-locked in the network communications component in that once the transmission rate is set, and the maximum transmission rate stored in the vital product data, the maximum transmission rate may not be altered. For example, the entry in the vital product data that indicates whether the transmission rate is set may only be altered one way—from unset to set. Once set, the transmission rate may not be unset. This may be accomplished, for example, by changing the entry from read-write to read-only once the transmission rate is set.

Figure 5:
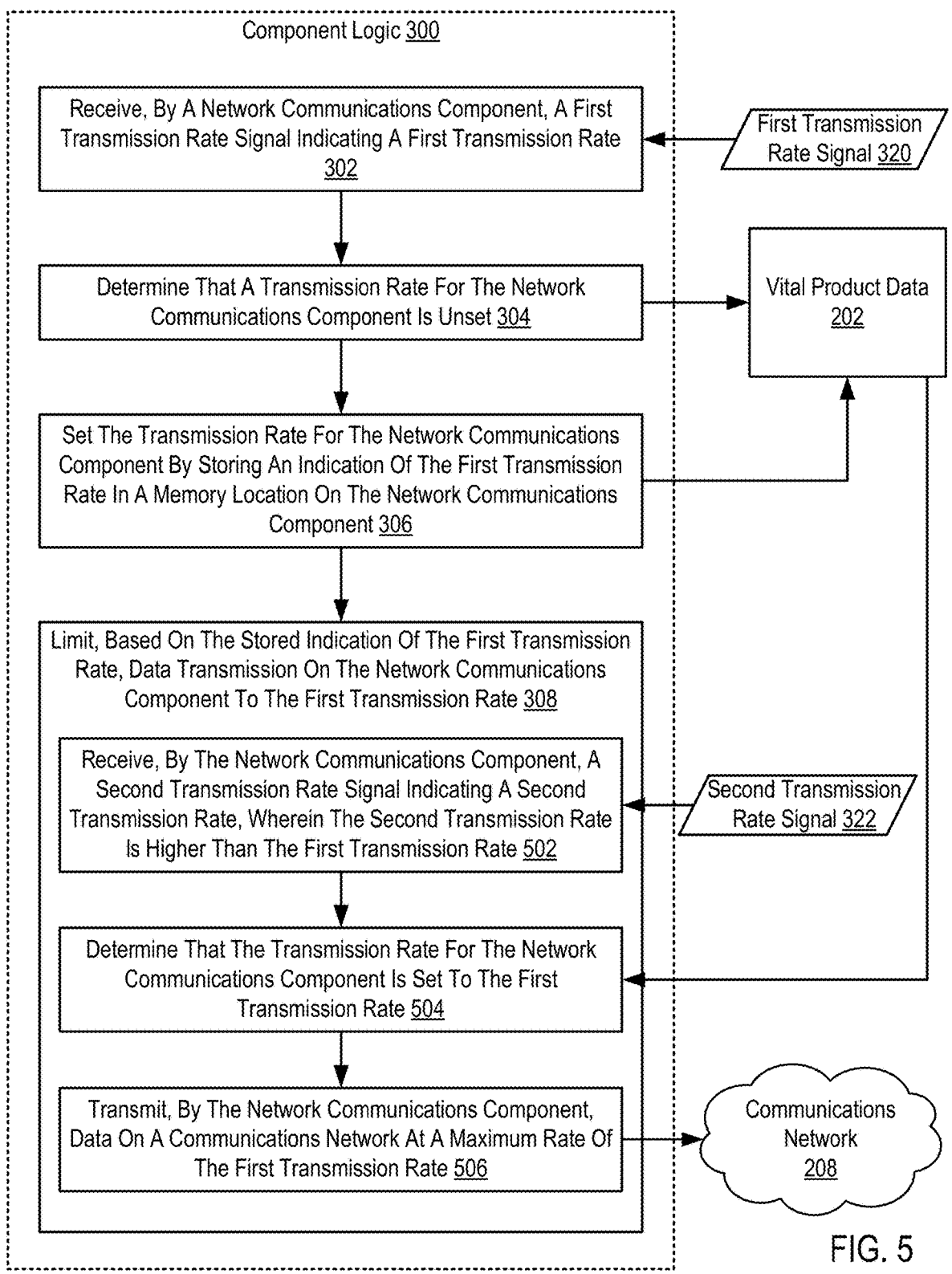
FIG. 5 sets forth a flow chart illustrating an exemplary method for self-locking a network communications component transmission rate according to embodiments of the present invention.

For further explanation, FIG. 5 sets forth a flow chart illustrating an exemplary method for self-locking a network communications component transmission rate according to embodiments of the present invention that includes receiving (302), by a network communications component, a first transmission rate signal (320) indicating a first transmission rate; determining (304) that a transmission rate for the network communications component is unset; setting (306) the transmission rate for the network communications component by storing an indication of the first transmission rate in a memory location on the network communications component; and limiting (308), based on the stored indication of the first transmission rate, data transmission on the network communications component to the first transmission rate.

The method of FIG. 5 differs from the method of FIG. 3, however, in that limiting (308), based on the stored indication of the first transmission rate, data transmission on the network communications component to the first transmission rate includes receiving (502), by the network communications component, a second transmission rate signal (322) indicating a second transmission rate, wherein the second transmission rate is higher than the first transmission rate; determining (504) that the transmission rate for the network communications component is set to the first transmission rate; and transmitting (506), by the network communications component, data on a communications network (208) at a maximum rate of the first transmission rate.

Receiving (502), by the network communications component, a second transmission rate signal (322) indicating a second transmission rate, wherein the second transmission rate is higher than the first transmission rate may be carried out by operatively coupling the network communications component to a communications network (e.g., a single computing system, a local area network, etc.) and transmitting an auto-detect or auto-negotiate message on the communications network. In response, the network communications component may receive the second transmission rate signal (322). The second transmission rate signal (322) is a transmission rate signal received by the network communications component after the first transmission rate signal (320) is received.

Determining (504) that the transmission rate for the network communications component is set to the first transmission rate may be carried out by accessing an entry for the transmission rate in the vital product data (202) stored on the network communications component; and determining that the entry for the transmission rate indicates that a transmission rate has been set for the network communications component. Transmitting (506), by the network communications component, data on a communications network (208) at a maximum rate of the first transmission rate may be carried out by throttling the data transmission rate to a maximum transmission rate as described in the vital product data for the network communications component.

For example, a manufacturer may receive an order from a customer for an 8 Gb/s transceiver. The manufacturer may have an inventory of 32 Gb/s transceivers. The manufacture may attach a 32 Gb/s transceiver to a network interface adapter and communications network advertising a transmission rate of 8 Gb/s. The 32 Gb/s transceiver receives the first transmission rate signal that indicates a transmission rate of 8 Gb/s. The component logic within the 32 Gb/s transceiver determines that the transmission rate in the vital product data is unset. The component logic within the 32 Gb/s transceiver then sets the transmission rate within the vital product data to 8 Gb/s.

Once the customer receives the 8 Gb/s transceiver she ordered, she may attach that 8 Gb/s transceiver to a network interface adapter and communications network advertising 16 Gb/s. The 8 Gb/s transceiver receives the second transmission rate signal that indicates a transmission rate of 16 Gb/s. The component logic within the 8 Gb/s transceiver determines that the transmission rate in the vital product data is set to a maximum transmission rate of 8 Gb/s. The 8 Gb/s transceiver, therefore, will only transmit data at a maximum rate of 8 Gb/s despite being operatively coupled to a network interface adapter and communications network capable of transmitting data at 16 Gb/s (and despite the transceiver having hardware capable of transmitting data at 32 Gb/s).

Figure 6:
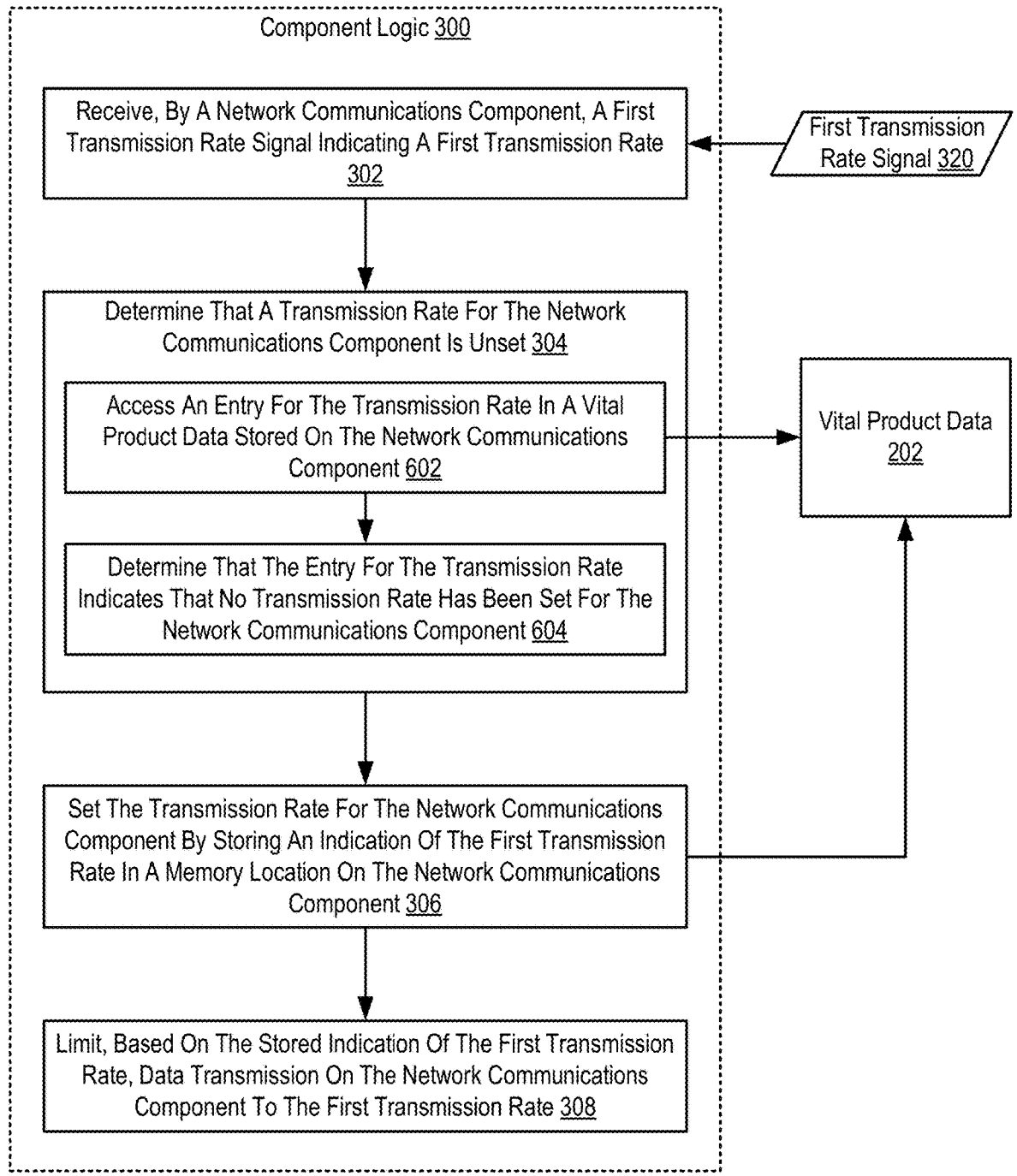
FIG. 6 sets forth a flow chart illustrating an exemplary method for self-locking a network communications component transmission rate according to embodiments of the present invention.

For further explanation, FIG. 6 sets forth a flow chart illustrating an exemplary method for self-locking a network communications component transmission rate according to embodiments of the present invention that includes receiving (302), by a network communications component, a first transmission rate signal (320) indicating a first transmission rate; determining (304) that a transmission rate for the network communications component is unset; setting (306) the transmission rate for the network communications component by storing an indication of the first transmission rate in a memory location on the network communications component; and limiting (308), based on the stored indication of the first transmission rate, data transmission on the network communications component to the first transmission rate.

The method of FIG. 6 differs from the method of FIG. 3, however, in that determining (304) that a transmission rate for the network communications component is unset includes accessing (602) an entry for the transmission rate in a vital product data (202) stored on the network communications component; and determining (604) that the entry for the transmission rate indicates that no transmission rate has been set for the network communications component.

Accessing (602) an entry for the transmission rate in a vital product data (202) stored on the network communications component may be carried out by determining which entry in the vital product data (202) corresponds to the entry that indicates whether the transmission rate for the network communications component is set. The vital product data (202) may include one entry that indicates whether the transmission rate for the network communications component is set and another entry indicating the maximum transmission rate of the network communications component. Alternatively, a single entry in the vital product data (202) may instead be used. For example, the entry in the vital product data (202) may store a null entry or '0' to indicate that the transmission rate is unset and a non-null entry or value that both indicates that the transmission rate is set and provides the set transmission rate (e.g., '8' indicating that the transmission rate is set, and the value is 8 Gb/s).

Determining (604) that the entry for the transmission rate indicates that no transmission rate has been set for the network communications component may be carried out by comparing the value read from the entry to an expected value indicating an unset transmission rate. For example, if the value read from the vital product data (202) is equal to 0, then the component logic (300) determines that the transmission rate is unset.

In view of the explanations set forth above, readers will recognize that the benefits of self-locking a network communications component transmission rate according to embodiments of the present invention include:

Improving the operation of network communications components by locking transmission speeds on first use to increase device flexibility and versatility.

Improving the manufacturing of network communications components by locking transmission speeds on first use, increasing manufacturing efficiency.

Exemplary embodiments of the present invention are described largely in the context of a fully functional computer system for self-locking a network communications component transmission rate. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:
1. A method comprising:
by first program instructions executed by a network communications component that is configured to transmit at a plurality of physical layer transmission rates:

receiving, by the network communications component, a first transmission rate signal indicating a first transmission rate, the first transmission rate being selected from among the plurality of physical layer transmission rates;

determining that a physical layer transmission rate that corresponds to a maximum rate at which the network communications component transmits is unset on the network communications component;

setting the physical layer transmission rate for the network communications component by storing an indication of the first transmission rate in a memory location on the network communications component; and limiting, based on the stored indication of the first transmission rate, a physical layer rate of data transmission by the network communications component to not exceed the set transmission rate.

2. The method of claim 1, wherein the network communications component is one selected from a group consisting of a network interface card and a transceiver for a network interface adapter.

3. The method of claim 1, wherein storing the indication of the first transmission rate in a memory location on the network communications component comprises storing the indication of the first transmission rate in a vital product data in non-volatile memory on the network communications component.

4. The method of claim 1, wherein storing the indication of the first transmission rate in the memory location on the network communications component self-locks the network communications component to a maximum transmission rate of the first transmission rate.

5. The method of claim 1, wherein limiting subsequent communications on the network communications component to the first transmission rate comprises:

receiving, by the network communications component, a second transmission rate signal indicating a second transmission rate, wherein the second transmission rate is higher than the first transmission rate;

determining that the transmission rate for the network communications component is set to the first transmission rate; and transmitting, by the network communications component, data on a communications network at a maximum rate of the first transmission rate.

6. The method of claim 1, wherein the first transmission rate signal is received in response to operatively coupling the network communications component to a communications network.

7. The method of claim 1, wherein determining that a transmission rate for the network communications component is unset comprises:

accessing an entry for the transmission rate in a vital product data stored on the network communications component; and determining that the entry for the transmission rate indicates that no transmission rate has been set for the network communications component.

8. An apparatus comprising a network communications component, the network communications component including logic that causes the apparatus to carry out the steps of:

receiving a first transmission rate signal indicating a first transmission rate the network communications component configured to transmit at a plurality of physical layer transmission rates, the first transmission rate being selected from among the plurality of physical layer transmission rates;

determining that a physical layer transmission rate that corresponds to a maximum rate at which the network communications component transmits is unset on the network communications component;

setting the physical layer transmission rate for the network communications component by storing an indication of the first transmission rate in a memory location on the network communications component; and limiting, based on the stored indication of the first transmission rate, a physical layer rate of data transmission by the network communications component to not exceed the set transmission rate.

9. The apparatus of claim 8, wherein the network communications component is one selected from a group consisting of a network interface card and a transceiver for a network interface adapter.

10. The apparatus of claim 8, wherein storing the indication of the first transmission rate in a memory location on the network communications component comprises storing the indication of the first transmission rate in a vital product data in non-volatile memory on the network communications component.

11. The apparatus of claim 8, wherein storing the indication of the first transmission rate in the memory location on the network communications component self-locks the network communications component to a maximum transmission rate of the first transmission rate.

12. The apparatus of claim 8, wherein limiting subsequent communications on the network communications component to the first transmission rate comprises:

receiving a second transmission rate signal indicating a second transmission rate, wherein the second transmission rate is higher than the first transmission rate;

determining that the transmission rate for the network communications component is set to the first transmission rate; and transmitting, by the network communications component, data on a communications network at a maximum rate of the first transmission rate.

13. The apparatus of claim 8, wherein the first transmission rate signal is received in response to operatively coupling the network communications component to a communications network.

14. The apparatus of claim 8, wherein determining that a transmission rate for the network communications component is unset comprises:

accessing an entry for the transmission rate in a vital product data stored on the network communications component; and determining that the entry for the transmission rate indicates that no transmission rate has been set for the network communications component.

15. A computer program product comprising a computer readable storage medium, the computer readable storage medium comprising computer program instructions that, when executed, cause a network communications component to carry out the steps of:

receiving, by the network communications component, a first transmission rate signal indicating a first transmission rate, the network communications program configured to transmit at a plurality of physical layer transmission rates, the first transmission rate being selected from among the plurality of physical layer transmission rates;

determining that a physical layer transmission rate that corresponds to a maximum rate at which the network communications component transmits is unset on the network communications component;

setting the physical layer transmission rate for the network communications component by storing an indication of the first transmission rate in a memory location on the network communications component; and limiting, based on the stored indication of the first transmission rate, a physical layer rate of data transmission by the network communications component to not exceed the set transmission rate.

16. The computer program product of claim 15, wherein the network communications component is one selected from a group consisting of a network interface card and a transceiver for a network interface adapter.

17. The computer program product of claim 15, wherein storing the indication of the first transmission rate in a memory location on the network communications component comprises storing the indication of the first transmission rate in a vital product data in non-volatile memory on the network communications component.

18. The computer program product of claim 15, wherein storing the indication of the first transmission rate in the memory location on the network communications component self-locks the network communications component to a maximum transmission rate of the first transmission rate.

19. The computer program product of claim 15, wherein limiting subsequent communications on the network communications component to the first transmission rate comprises:

receiving, by the network communications component, a second transmission rate signal indicating a second transmission rate, wherein the second transmission rate is higher than the first transmission rate;

determining that the transmission rate for the network communications component is set to the first transmission rate; and transmitting, by the network communications component, data on a communications network at a maximum rate of the first transmission rate.

20. The computer program product of claim 15, wherein the first transmission rate signal is received in response to operatively coupling the network communications component to a communications network.

* * * * *